US009891697B2

(12) United States Patent
Schoppmeier et al.

(10) Patent No.: US 9,891,697 B2
(45) Date of Patent: Feb. 13, 2018

(54) OPTIMIZING POWER CONSUMPTION IN A COMMUNICATION SYSTEM

(71) Applicant: Lantiq Deutschland GmbH, Neubiberg (DE)

(72) Inventors: Dietmar Schoppmeier, Unterhaching (DE); Stefan Uhlemann, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 591 days.

(21) Appl. No.: 14/087,403

(22) Filed: Nov. 22, 2013

(65) Prior Publication Data

US 2014/0157028 A1   Jun. 5, 2014

(30) Foreign Application Priority Data

Nov. 22, 2012   (EP) ..................................... 12193867

(51) Int. Cl.
*G06F 1/32* (2006.01)
*H04M 11/06* (2006.01)
*H04L 5/00* (2006.01)
*H04W 52/28* (2009.01)
*H04B 17/336* (2015.01)

(52) U.S. Cl.
CPC .......... *G06F 1/3293* (2013.01); *H04L 5/0046* (2013.01); *H04M 11/062* (2013.01); *H04W 52/288* (2013.01); *H04B 17/336* (2015.01)

(58) Field of Classification Search
CPC ... G06F 1/3234; H04B 17/336; H04L 5/0046; H04M 11/062; H04W 52/288
See application file for complete search history.

(56) References Cited

U.S. PATENT DOCUMENTS

| 6,002,762 A * | 12/1999 | Ramsden | ................ H04M 3/18 379/24 |
| 7,486,608 B1 * | 2/2009 | Long | .................... H04L 5/0007 370/207 |
| 2003/0223354 A1 * | 12/2003 | Olszewski | ................ H04L 1/20 370/208 |
| 2005/0213405 A1 | 9/2005 | Stopler | |

(Continued)

FOREIGN PATENT DOCUMENTS

EP   2237470 A1   10/2010

*Primary Examiner* — Nitin Patel
*Assistant Examiner* — Kevin Stewart
(74) *Attorney, Agent, or Firm* — Eschweiler & Potashnik, LLC

(57) ABSTRACT

Within a communication system that includes multiple communication channels, a low-power mode of operation and a higher-power mode of operation are provided. Each channel is allocated to one of several groups, based on criteria such as whether power is allocated to that channel in low power mode, and whether power was allocated to that channel in a previous high power mode. Initial power levels for each channel for each mode are approximated using an interpolation rule known to both the receive and the transmitter. The system switches between modes according to a PMD pre-defined schedule. When a new power mode begins, the receiver measures signal power received on each channel and then transmits corrective information sufficient to allow adaptation of power levels to achieve PMD pre-defined levels of received power.

18 Claims, 11 Drawing Sheets

(56) References Cited

U.S. PATENT DOCUMENTS

| | | | |
|---|---|---|---|
| 2005/0271129 A1* | 12/2005 | Reina | H04L 1/0025 375/222 |
| 2009/0180526 A1 | 7/2009 | Long | |
| 2010/0091909 A1* | 4/2010 | Ericson | H04L 1/004 375/329 |
| 2010/0111081 A1* | 5/2010 | Diab | H04L 12/12 370/389 |
| 2011/0317607 A1* | 12/2011 | Wu | H04L 5/0037 370/312 |
| 2013/0287068 A1* | 10/2013 | Ashikhmin | H04L 5/0046 375/219 |

* cited by examiner

# OPTIMIZING POWER CONSUMPTION IN A COMMUNICATION SYSTEM

PRIORITY CLAIM

This application claims priority to European Patent Application No. 12 193 867.4, filed on 22 Nov. 2012, the content of said European application incorporated herein by reference in its entirety.

TECHNICAL FIELD

Existing DSL lines use DMT tones for communication. Such lines include at least two modes of operation, of which is a low-power mode. Even in low-power mode, most of the carriers of DMT tones in DSL lines remain active, primarily for the purpose of monitoring noise on the communication lines. Noise is monitored so that when the DMT carrier switches from low-power mode to a higher-power mode, the switch can occur very quickly at power levels for the sufficient to overcome the noise on the communication lines. The current system is less than optimal, in that many DMT carriers are active in low-power mode, even if they are not transmitting data. If DMT carriers could be turned off in low-power mode, substantial energy saving could be achieved.

Another problem in existing DSL systems is that power levels, or information rates, or both, change at such rates of speed that receivers and transmitters do not have sufficient time to communicate full data tables for all DMT carriers for every change. As a result, in existing systems, receivers and transmitters store large data tables which allow them to complete changes at the rate required. This implementation in current systems is deficient, in that these large data tables require space and energy to store at both the receivers and the transmitters. One solution might be to reduce in size the data tables, and instead send more data between receivers and transmitters before a change is made. However, such a solution would require significant quantities of power, and even then the rate of change would be limited by the maximum speeds of communication possible between the receivers and the transmitters. If it were possible to reduce the amount of data that must be either stored or transmitted in order to effect changes, benefits could be in memory space saved, or in power consumed, or in both memory space and power consumption.

SUMMARY

In a first aspect the invention encompasses a method for communicating within a communication system that includes a plurality of communication channels operable to communicate bits of information in a high power mode of operation and operable to communicate bits of information in a low power mode of operation. The method comprises, for the low power mode of operation, selectively allocating power to a channel in the plurality of communication channels based on channel use during the high power mode of operation of the respective channel. At least one effect of the invention in the first aspect is to enable an efficient and more widely used power save mode. For example, should only a relatively small amount of data need to be transmitted per time unit, rather than conventionally powering all channels, a selected number of channels may be powered to enable transmission at low power as required to load a small number of bits on the respectively selected channel. In particular, the channels may be powered just enough to load a minimum number of bits on the respectively selected channel.

In an embodiment according to the invention in the first aspect selectively allocating power comprises, if in the high power mode of operation the respective channel does not communicate any bits of information, determining not to communicate any bits of information in the low power mode. At least one effect is that channels that would require a lot of power to load even a small number of bits can be disregarded for transmission; in turn only those channels that allow transmission of bits at relatively low power can be used.

In an embodiment according to the invention in the first aspect selectively allocating power comprises determining to enable measurement of a signal-to-noise ratio (SNR) in the low power mode. At least one effect is that SNR measurement results can be obtained and processed during low power mode on channels that are hardly or not at all used for data transmission. Thus, when going back to a high power mode, in particular when going back to an operation at full power, control parameters, in particular, physical media dependent (PMD) parameters can swiftly be determined to control the respective channel. In an embodiment the measurement is continuous throughout low power mode. In one embodiment according to the invention in the first aspect the measurement in low power mode is intermittent. At least one effect is to further save power in comparison with measuring SNR continuously. In an embodiment the measurement is cyclically intermittent. At least one effect is to enable co-ordination of measurement on a set of channels in the plurality of channels. In an embodiment at least two respective channels determined to enable intermittent measurement of the signal-to-noise ratio in the low power mode form a group, and wherein power allocated to channels in the group is allocated to one channel in the group at a time. The channels in a group can be, but do not necessarily need to be adjacent in terms of frequency.

In an embodiment according to the invention in the first aspect measurement of a signal-to-noise ratio comprises performing an Fourier transformation. Further, the number of frequencies used in the Fourier transformation varies with a maximum frequency used for the signal-to-noise ratio measurement in the plurality of communication channels. At least one effect is that processing power and time are kept low since some frequencies that do not contribute to transmission are disregarded in the Fourier transformation. In an embodiment the number of frequencies used in the Fourier transformation varies proportionally to the maximum frequency used for the signal-to-noise ratio measurement in the plurality of communication channels.

An embodiment according to the invention in the first aspect comprises, if in the high power mode of operation the respective channel communicates bits of information, determining to enable communication of at least one bit of information in the low power mode of operation per predetermined unit of time. At least one effect is that information about channel quality readily available in high power mode can be "reused" in low power. Such information, for example, can be that a channel used for transmission in the high power mode of operation is preferable over a channel not used for transmission in the high power mode of operation. In the example, this information can be interpreted to provide an indication for use of the respective channel for transmission also to be preferable in the low power mode of operation over another channel not used for transmission in the high power mode of operation.

In an embodiment according to the invention in the first aspect the power allocated in the respective channel during the low power mode of operation is commensurate with the determining for the selected channel. At least one effect is that the power is sufficient to achieve the determined performance, such as measurement of SNR in the respective channel, or loading of a determined number of bits onto the channel per unit time.

In an embodiment according to the invention in the first aspect the high power mode of operation of the respective channel immediately precedes the low power mode of operation of the respective channel.

In a second aspect the invention encompasses a computer readable medium. The medium stores software adapted to perform steps of the method according to the invention in the first aspect.

In a third aspect the invention encompasses an apparatus for use in a communications system having a plurality of communication channels operable to communicate bits of information in a high power mode of operation and operable to communicate bits of information in a low power mode of operation. The apparatus is adapted to perform steps of the method according to the invention in the first aspect.

In a fourth aspect the invention encompasses a communications system having at least one apparatus according to the invention in the third aspect. In an embodiment the system is adapted to perform steps of the method according to the invention in the first aspect.

Below, the invention is described in further exemplary aspects and further exemplary embodiments according to the invention are described. In one embodiment, DMT channels are allocated among different groups, based upon whether each such channel transmits information during low power mode, and whether each such channel transmitted information in a prior high power mode. Herein, "high power mode" refers to at least one mode of operation with more power than provided in the low power mode. Based on such allocations, some DMT channels may be turned off completely turning low-power mode, thereby saving power.

In an alternative embodiment, two or more power scenarios are defined within low-power mode, in which specific channels may be turned on in one such scenario to monitor noise level, and such channels may then be turned off in other scenarios in order to converse power.

Many of the embodiments are applicable to multiple communication systems, provided that each such system combines multiple channels within the system. Therefore, various embodiments may apply to DSL systems, which combine together DMT carriers. Various embodiments may also apply to trunked land-mobile or trunked satellite radio systems, which combine multiple radio channels. Various embodiments may also apply to dense wavelength division multiplexing ("DWDM") or other optical communication systems, which combine multiple channels. In any of the systems noted herein, the various channels may be tied together with a physical binder, as in DSL systems and optical systems, or logically, as with trunked or satellite radio.

One embodiment is a method for communicating within a communication system that includes multiple communication channels, a low-power mode of operation, and at least one higher-power mode of operation. In such an embodiment, a communication channel, such as, for example, a DMT carrier or a DWDM channel, will be allocated to either of two groups. Group A is channels which do not communicate bits of information in low-power mode and which did not communicate bits of information in the previous higher-power mode of operation. Group B is channels which do not communicate bits in low-power mode and which did communicate bits of information in the previous high power mode. In such an embodiment, during low-power mode, power is not allocated to channels in Group A, but sufficient power is allocated to each channel in Group B so that a resulting SNR for each channel shall be sufficient for the system to monitor the noise in that channel. In such an embodiment, all steps stated above are implemented in an implementation unit, which may be located on either the server-side of the communication system, or on the client-side of the communication system.

One embodiment is a method for communicating within a communication system that includes multiple communication channels, a low-power mode of operation, and at least one high power mode of operation. In such an embodiment, a communication channel, such as, for example, a DMT carrier or a DWDM channel, will be allocated to either of two groups. Group A is channels which do not communicate bits of information in low-power mode and which did not communicate bits of information in the high power mode of operation. Group C is channels which communicate bits in low-power mode. In such an embodiment, during low-power mode, power is not allocated to channels in Group A, but sufficient power is allocated to each channel in Group C so that resulting SNR shall be sufficient for the system to load at least one bit per time slot onto that channel. In such an embodiment, all steps stated above are implemented in an implementation unit, which may be located on either the server-side of the communication system, or on the client-side of the communication system.

In one embodiment, the system stores pre-defined configured values for some number of channels that is less than the total number of channels in the system. The system also stores an interpolation rule. The system measures actual values of received power for some of the channels during a high power mode of operation. Using the margin between actual and configured power levels for some of the channels during the high power mode of operation, the interpolation rule will calculate approximated values for the other channels in the system. Such calculations will occur at both a receiver and a transmitter in the system, so that when the system switches from low-power mode to a high power mode, communication between receivers and transmitters will occur at the approximated power values. Switches from low-power mode to high power modes and vice versa, are executed at pre-defined PMD times which are stored in the receivers and transmitters. In one embodiment, actual values are not stored, the lack of storage reduces the memory storage space required, and the lack of storage reduces power levels to maintain memory. In one embodiment, communication of approximated values between a receiver and a transmitter is not required, thereby reducing transmit power of communication between the transmitter and the receiver.

One embodiment is a method for communication within a communication system that includes multiple communication channels, a low-power mode of operation, and a high power mode of operation. In this embodiment, PMD control parameters for a high power mode are stored during a low-power mode. In one embodiment, the system stores pre-defined configured values for some channels, a pre-defined interpolation rule for approximating power levels at communication channels in the system, and pre-defined PMD times for switching from one power mode to another power mode. The system uses the configured values and the interpolation rule to determine approximated values of high power mode for channels in the system. The system stores these approximated values at a memory storage unit associated with a receiver in the system. In some alternative embodiments, the receiver is located at the client-side, and in other alternative embodiments, the receiver is located at the server-side.

In an aspect the invention encompasses a method for communicating within a communication system that includes multiple communication channels, a low-power mode of operation, and a high power mode of operation. The method comprises—allocating each channel to one of at least two groups. The at least two groups include a group A with channels which do not communicate bits of information in low power mode and which did not communicate bits of information in a previous full power mode of operation, and a group B with channels which do not communicate bits in low power mode and which did communicate bits of information in the previous high power mode. The method comprises not allocating any power to the channels in group A when the system is in low power mode; and allocating sufficient power to each channel in group B when the system is in low power mode so that a resulting SNR shall be sufficient for the system to monitor the noise in that channel. In an embodiment all prior steps are implemented by an implementation unit that is located at either the server-side or the client-side. Herein, irrespective of the direction of transmission being downlink or uplink, the server-side can be the side of the transmitter and the client-side can be the side of the receiver. In an embodiment the high power mode is provided as a full power mode.

In an aspect the invention encompasses a method for communicating within a communication system that includes multiple communication channels, a low-power mode of operation, and a high power mode of operation. The method comprises allocating each channel to one of at least two groups, in which group A is channels which do not communicate bits of information in low-power mode and which did not communicate bits of information in a previous high power mode of operation, and group C is channels which communicate bits of information in low-power mode. The method comprises not allocating any power to the channels in group A when the system is in low-power mode; and allocating sufficient power to each channel in group C when the system is in low-power mode so a resulting SNR shall be sufficient for the system to load at least one bit per time slot onto that channel. In an embodiment all prior steps are implemented by an implementation unit that is located at either the server-side or the client-side. In an embodiment of the method according to the invention the allocating of channels includes an allocating to a third group C of channels which communicate bits of information in low-power mode; and allocating sufficient power to each channel in group C when the system is in low-power mode. At least one effect of this embodiment is that a resulting SNR can be sufficient for the system to load at least one bit per time slot onto that channel during low-power mode. In an embodiment the channels in group B are further allocated into subgroups on the basis of a criterion. In an embodiment the criterion for sub-grouping of channels in group B is the duration of time of transmission for each channel. In an embodiment the criterion for sub-grouping of channels in group B is random allocation such that no channel in group B is correlated with any other channel in group B. In an embodiment the criterion for sub-grouping of channels in group B is the kind of noise anticipated for each such channel within group B. In an embodiment the noise anticipated for the channels within group B is either quickly changing noise or slowly changing noise. In an embodiment the noise is quickly changing, and the quickly changing noise is selected from the group including ham or other amateur radio operations, police radio operations, and land mobile operations. In an embodiment the noise is slowly changing, and the slowly changing noise is selected from the group including AM radio and FM radio. In an embodiment the noise anticipated for each channel within group B is the level of cross-talk anticipated between two or more channels communicating at substantially the same time and in substantially the same frequency. In an embodiment channels are allocated by anticipated level of crosstalk in such a way as to maximize such cross-talk in order to monitor it. In an embodiment channels in group B are repeatedly turned on and off in such a manner that the amount of power-on time is reduced while still maintaining the monitoring of noise within the group B channels. In an embodiment channels are defined according to one more channels definers. In an embodiment the channel definers are selected from the group comprising frequency, time slots, and codes. In an embodiment channels in groups A and B are repeatedly turned on and off in such a manner that the amount of power-on time is reduced while still maintaining the monitoring of noise within the group B channels. In an embodiment channels are defined according to one or more channels definers. In an embodiment the channel definers are selected from the group comprising frequency, time slots, and codes.

In a further aspect the invention encompasses, in a communication system that includes multiple communication channels, operable in a low power mode, and operable in a high power mode, a method for storing control parameters for use in high power mode. In an embodiment control parameters are written into storage during high power mode. In an embodiment control parameters are stored in the storage during low power mode. In an embodiment control parameters are read from the storage during low power mode. In an embodiment control parameters comprise physical media dependent (PMD) parameters. In an embodiment control parameters comprise a frequency value, an associated signal-to-noise ratio, an associated gain value an associated bit value. In an embodiment, for a plurality of frequencies, the associated gain value and the associated bit value are stored, respectively. In an embodiment the method comprises storing at least one pre-defined configured value for some channels, storing a pre-defined interpolation rule for approximating power levels of communication channels in the system; and approximating values of a high-power mode for the channels with stored configured values. In an embodiment the method comprises storing pre-defined times for switching from one power mode to another power mode, in particular for switching from the low power mode to the high power mode. In an embodiment approximated values are stored that are associated with frequencies for which otherwise no parameters are being stored. In an embodiment all storage occurs in a memory storage unit associated with a receiver in the communication system. An embodiment comprises using the approximated values and the interpolation rule to approximate the values of high power mode for the remaining channels. An embodiment comprises communicating some of the approximated values from the PMD layer to one or more higher layers in the OSI model. An embodiment comprises, after a system transition has begun from low power mode to a high power mode, comparing service value parameters of signals received to the approximated service value parameters, adjusting power levels of channels to optimize service.

An embodiment further comprises, after a system transition has begun from low power mode to a high power mode, comparing service value parameters of signals received to the approximated service value parameters, adjusting power levels of channels to optimize service, and modifying the interpolation rule to more accurately reflect the service value parameters of signals received. An embodiment further comprises, after a system transition has begun from low power mode to a high power mode, comparing service value parameters of signals received to the approximated service value parameters, adjusting power levels of channels to optimize service, and modifying the interpolation rule to more accurately reflect the service value parameters of signals received.

Those skilled in the art will recognize additional features and advantages upon reading the following detailed description, and upon viewing the accompanying drawings.

BRIEF DESCRIPTION OF THE DRAWINGS

The embodiments are herein described by way of example only; further exemplary embodiments are described below with reference to the accompanying drawings. No attempt is made to show structural details of the embodiments in more detail than is necessary for a fundamental understanding of the embodiments.

DETAILED DESCRIPTION

Figure 1:
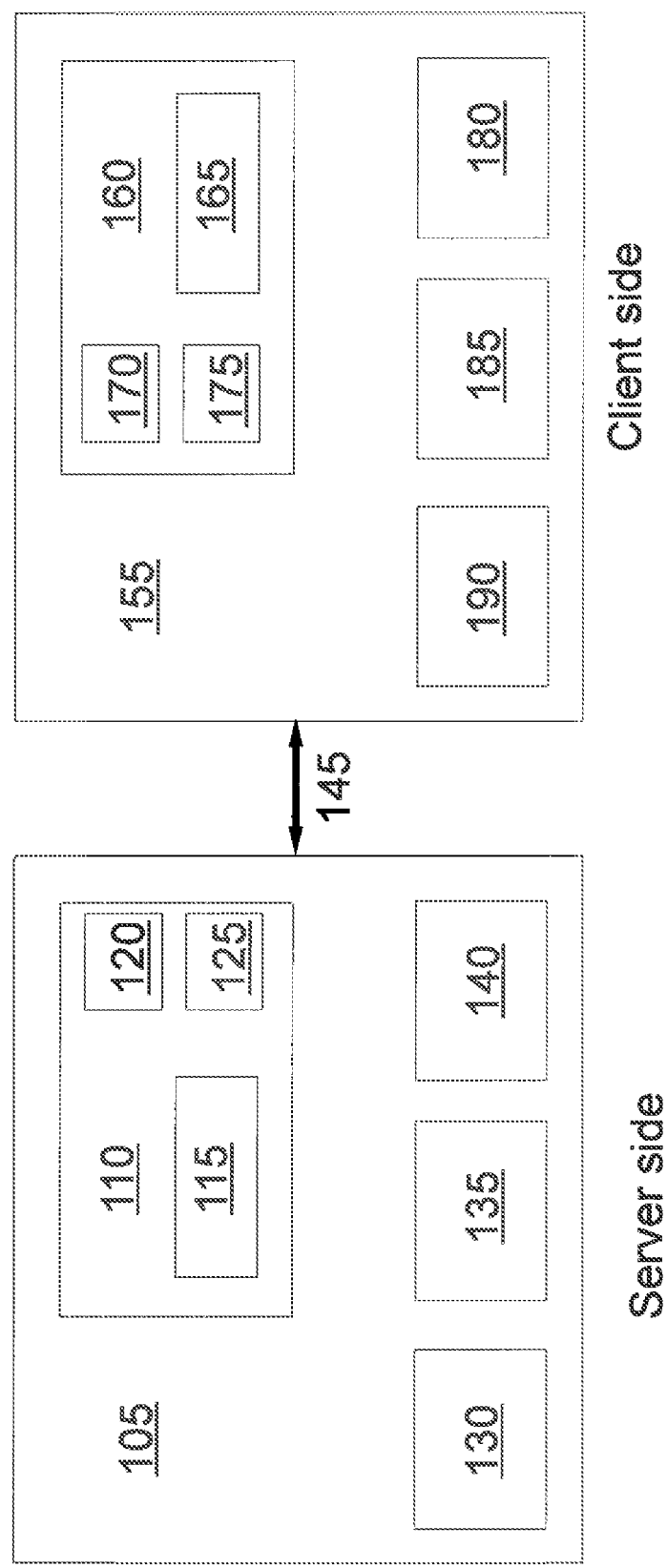
FIG. 1 illustrates one embodiment of a communication system including a server-side transceiver and a client-side transceiver.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity, and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

Throughout this written description and the claims, the term "actual value" is the power level sufficient to overcome noise in a channel at a particular time, typically but not exclusively, in a high power mode. Often this may be measured by SNR or SNRM. In some communication systems, "actual value" may include a parameter such as the level of power sufficient for communication of a certain number of bits per tone at a particular time.

Throughout this written description and the claims, the term "approximated value" is the power level value which is estimated to be sufficient to overcome the existing noise on a channel when the channel switches from low-power mode to a high power mode.

Through this written description and the claims, "bit loading" is transmission of information on a channel at a particular time. Bit loading requires that at least one bit of information be transmitted at a particular time. "Bit loading" is sometimes expressed by the phrase "communicating a bit of information", and this latter phrase means the same thing as "bit loading".

Throughout this written description and the claims, the term "client-side" is the hardware and software owned by, or controlled by, or located at, the customer's site, also known as the "consumer's side", or the "customer's premises". The term "client side" is sometimes referenced as "CPE", which is short for "customer premises equipment". In a cellular system or mobile system, the "client-side" would be the mobile station.

Throughout this written description and the claims, the term "configured value" is value of a received signal estimated prior to startup of the system, or prior to recalibration of the system, which is expected to be able to overcome the noise on the channel. "Configured value" might be equal at "actual value" for any particular time and on a particular channel, but there may be a variance between a configured value and the corresponding actual value.

Throughout this written description and claims, "interpolation rule" is a rule that takes the configured values of a sample of channels, compares the actual values of power levels received for such channels at a particular time, and uses the margin to determine approximated values for the other channels in a system.

Throughout this written description and the claims, the term "noise monitoring" is sampling of background noise on a particular channel at a particular time, unrelated to the transmission of information on the channel. Noise monitoring is not the same as "bit loading".

Throughout this written description and claims, "optimizing power consumption" means to reduce power consumption while maintaining a certain level of service, or to increase the level of service without significantly increasing power consumption. Similarly, "to optimize service" means to improve the service level of a system, or alternatively to achieve a desired level of service at a reduced level of power consumption.

Throughout this written description and claims, the term "OSI model" is short for "Open Systems Interconnection model", and is a model of communication between two units in a communication system in which each unit in the system has the same number and kind of pre-defined layers, and the two units communicate at one or more pairs of the corresponding layers. In the OSI model, the PMD layer is considered to be layer 1, and there are six layers above layer 1. All embodiments discussed herein involve layer 1 to at least some degree, and some embodiments includes layers other than layer 1.

Throughout this written description and the claims, the term "PMD" is an acronym for "physical medium dependent" layer, which is layer 1 in the seven-layer OSI model.

Throughout this written description and the claims, the term "power mode" is the various power levels active for the channels while the system is in a particular power mode. In the various embodiments presented herein, there are at least two, and possibly more, power modes. If there are exactly two power modes, then one will be the "low-power mode", and the other will be the "full power mode". If there are three or more power modes, then one will be the "low-power mode", and each of the other modes will be called a "higher-power mode". It is understood that if there are two or more high power modes, each such mode will have its own power allocation characteristics, which will be different from the power allocation characteristics of the low-power mode.

Throughout this written description and the claims, the term "processing unit" is hardware, software, or a combination of both, which analyzes bits and bytes in a way similar to what a computer would do, in order to transform such bits and bytes into useful information. A processing unit may be a CPU, an off-line processor, a combination of multiple processors performing parallel processing, or any similar kind of unit for processing bits and bytes into information.

Throughout this written description and the claims, the term "server side" is the hardware and software owned and controlled by the network operator. Also known as "operator side", or "the network control center", or "the network operations center", a "sever side" unit may be part of the server-side transceiver, or may be at the server-side but not physically part of the server-side transceiver.

Throughout this written description and the claims, the term "SNR" is short for "Signal to Noise Ratio", which is a measure of the power of a communication signal on a channel relative to the noise on the channel at a particular point in time. "SNRM" is short for "Signal to Noise Margin", which measures the level by which the noise might rise until communication is disrupted. SNR and SNRM are not the same, but they are both measures of signal quality.

Throughout this written description and the claims, the term "storage unit" is hardware, software, or a combination of both, which stores information in the form of bits and bytes. A storage unit may be part of a computer memory, RAM, ROM, off-line storage, FLASH memory, or any similar kind of unit for storing information.

FIG. 1 illustrates one embodiment of a communication system including a server-side transceiver and a client side-transceiver, with a communication link between the two transceivers. In FIG. 1, the server-side is itself a system 105, which includes various components. One included component is a transceiver unit 110, which itself includes a transmitter 120, a receiver 125, and a controller 115 which manages communication traffic into and out of the server-side system 105. The server-side system 105 also includes an implementation unit 130, which allocates channels within the system to various groups, and which allocates or does not allocate power to channels within the various groups. The server-side system 105 includes also a storage unit 135 which is a memory unit that stores power values, data tables, and other information required to implement various embodiments. The server-side system 105 also includes a calculation unit 140 which uses pre-defined configured values and a pre-defined interpolation rule to calculate approximated power values for various channels.

It will be understood that the particular configuration of components illustrated in FIG. 1 is only one of many configuration that may be implemented as part of the server-side system 105. For example, there is shown a transceiver unit 110 with three components, but these components may be configured separately from one another, or only the controller 115 may be structured apart from the transceiver unit 110, or the transmitter 120 and receiver 125 may be entirely separate with no transceiver unit 110. For example, any of the three components, implementation unit 130, storage unit 135, and calculation unit, may be combined with any one of the other three components, or all three components may be combined in a single unit that performs all of implementation, storage, and calculation. For example, any of the components depicted in the sever-side system 105 may be physically structured apart from other components in the server-side system 105, so that there is a communication link between the separate component and the rest of the server-side system 105. Many other alternative embodiments are also possible, provided that some or all of the functions executed by the various components shown in FIG. 1 must be executable in an alternative embodiment.

There is a communication link 145 between the server-side system 105 and a client-side system 155. The nature of the communication link 145 depends on the nature of the server-side 105 and client-side 155 systems. If the systems are DSL, then the link 145 will be a wireline, typically a telephone line, or perhaps a telephone line that is bundled with other telephone lines. If the systems 105 and 155 are optical systems, the link 145 will likely be fiber optic line. If the systems 105 and 155 are radio-based, meaning cellular, land mobile, satellite, or other wireless systems, there will not be a waveguide similar to a wireline, and the link 145 will be a radio connection. Communication link 145 may be any kind of communication link that communicatively connects a server-side and a client-side.

The client-side system 155 contains the same or similar components as found in the server-side system 105. One included component is a transceiver unit 160, which itself includes a transmitter 170, a receiver 175, and a controller 165 which manages communication traffic into and out of the client-side system 155. The client-side system also includes an implementation unit 180, which allocates channels within the system to various groups, and which allocates or does not allocate power to channels within the various groups. The client-side system 155 includes also a storage unit 185 which is a memory unit that stores power values, data tables, and other information required to implement various embodiments. The client-side system 155 also includes a calculation unit 190 which uses pre-defined configured values and a pre-defined interpolation rule to calculate approximated power values for various channels.

It will be understood that the particular configuration of components illustrated in FIG. 1 is only one of many configurations that may be implemented as part of the client-side system 155. For example, there is shown a transceiver unit 160 with three components, but these components may be configured separately from one another, or only the controller 165 may be structured apart from the transceiver unit 160, or the transmitter 170 and receiver 175 may be entirely separate with no transceiver unit 160. For example, any of the three components, implementation unit 180, storage unit 185, and calculation unit 190, may be combined with any one of the other three components, or all three components may be combined in a single unit that performs all of implementation, storage, and calculation. For example, any of the components depicted in the client-side system 155 may be structured apart from the system 155 itself, so that there is a communication link between the separate component and the rest of the system 155. Many other alternative embodiments are also possible, provided that some or all of the functions executed by the various components shown in FIG. 1 must be executable in an alternative embodiment.

Figure 2:
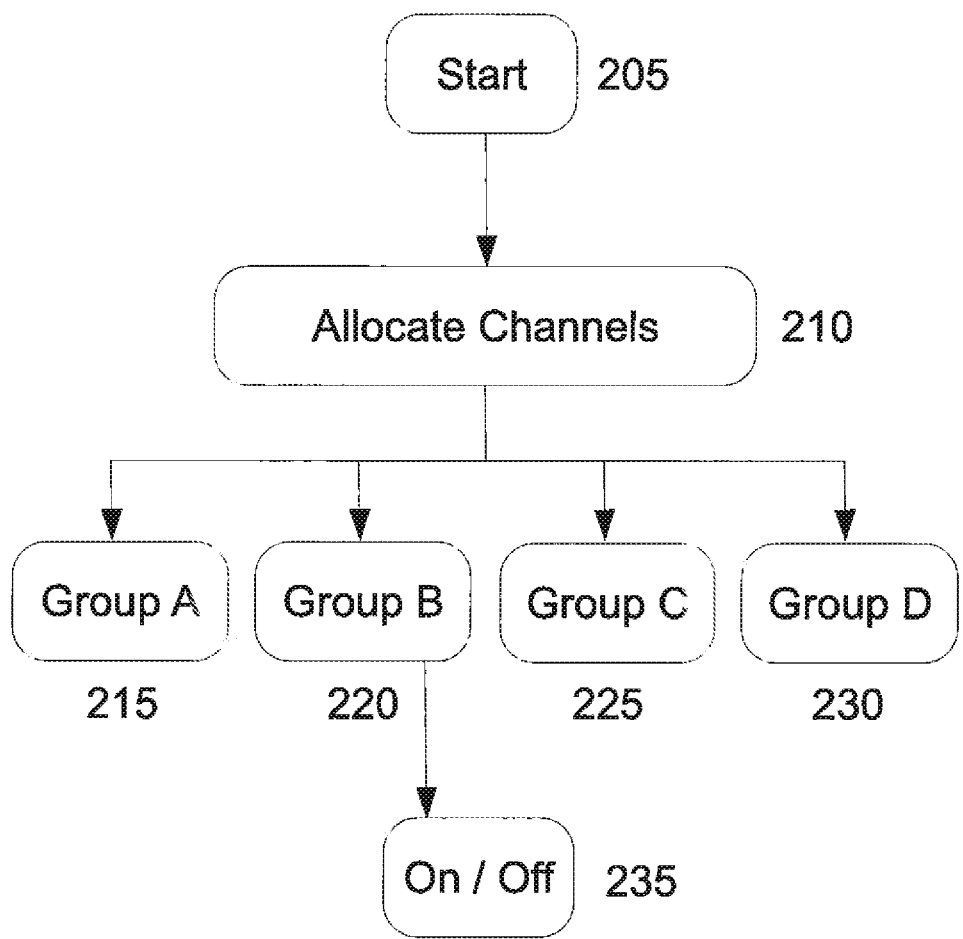
FIG. 2 illustrates one embodiment of a method for communicating within a system that includes multiple communication channels, a low-power mode of operation, and at least one high power mode of operation.

FIG. 2 illustrates one embodiment of a method for communicating within a system that includes multiple communication channels, a low-power mode of operation, and at least one high power mode of operation. At start 205, the system pre-defines multiple communication channels, a low-power mode of operation, and at least one higher-power mode of operation. In 210, channels are allocated into at least two groups, although there may be three or more groups as well. Some embodiments will include only Group A 215 and Group B 220, in which Group A 215 is channels which do not communicate bits of information in low power mode and which did not communicate bits of information in the previous higher-power mode of operation, while group B 225 is channels which do not communicate bits in low power mode and which did communicate bits of information in the previous higher-power mode. In other embodiments, there will be a Group A 215 as defined above, and a Group C 225 which is channels which communicate bits of information in low power mode. Many other kinds of channel groups are possible, as shown in Group D 230. For example, Group D 230 may be channels which have been defined as mission-critical for the system, and which remain on a pre-determined power at all times. Other criteria for Group D 230 are also possible. In addition to having any two groupings of channels from Groups A 215, B 220, C 225 and D 230, respectively, there may be a grouping with any of three groups, such as, solely as one example, Groups A 215, B 220, and C 225. A grouping with all four groups is also possible. Other configurations, involving more than four groupings of channels, are also possible, provided that the channel groups are defined in such a way that every channel is placed into one group. In some embodiments, one of the groups of channels may be turned on and off, in which "on" means that the power allocation during that period will be as pre-defined in the system, and the "off" means that no power is allocated to channels in that group during the off-period. One example, shown in FIG. 2, is on and off 235 for Group B 220.

Figure 3A:
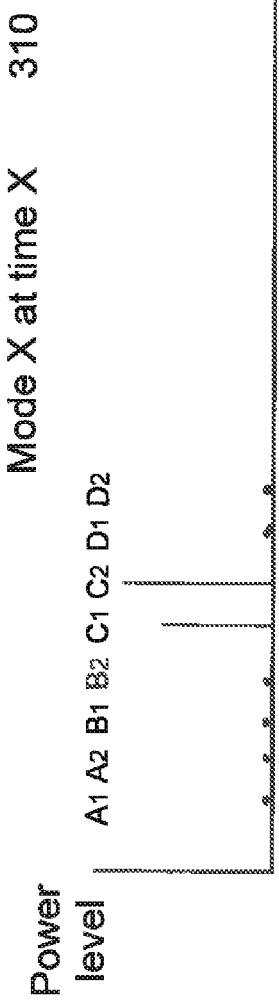
FIGS. 3A, 3B and 3C (collectively referred to as FIG. 3) illustrate one embodiment of a method for switching between multiple power modes in a communication system such that the transmission power of one or more groups of channels is reduced in at least one power mode.
Figure 3B:
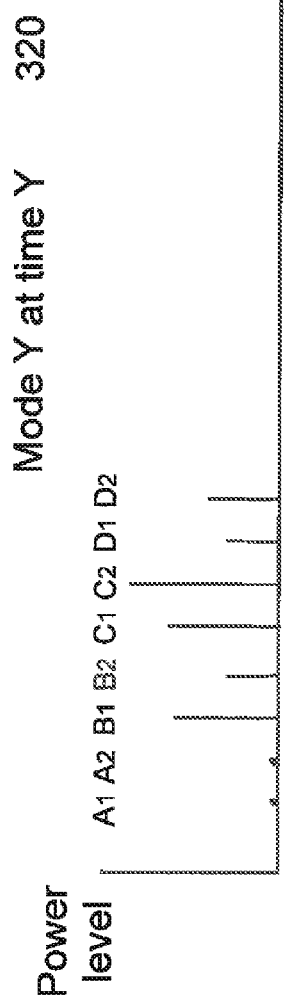

FIGS. 3A and 3B illustrate one embodiment of a method for switching between multiple power modes in a communication system such that the transmission power of one or more groups of channels is reduced in at least one power mode. The embodiment presented in FIG. 3C presents an example in which channel groups are turned on and off.

In FIG. 3A, in Mode X 310, all of the channels in Group A, Group B, and Group D, are turned off. However, Group C channels are turned on, in which channel C1 is defined at a certain power level, while channel C2 is defined at a different, higher power level. A "channel" is defined by a channel definer, which may be one of several factors. In an FDM system, the channel definer will be the frequency of the channel. In a TDM system, the channel definer will be the time slot of the channel. In a CDM system, the channel definer will be the code for that channel. Also, a channel may be defined by any combination of frequency, time slot, and code.

In FIG. 3B, in Mode Y 320, the power level configuration has changed. Group A channels are still turned off. However, the channels in Group B and Group D, which were formerly turned off in Mode X 310, are now turned on in Mode Y 320, in which channel B1 has been allocated a higher power level than channel B2, and channel D1 has been allocated a lower power level than channel D2. The channels in Group C are still on in Mode Y 320. In the example shown in FIG. 3B, channel C1 is still at a lower power level than channel C2, which will be the case in some embodiments, but in other embodiments, this may be changed, perhaps due to changes in noise levels, and channel C1 may have a higher power allocation than does channel C2.

Figure 3C:
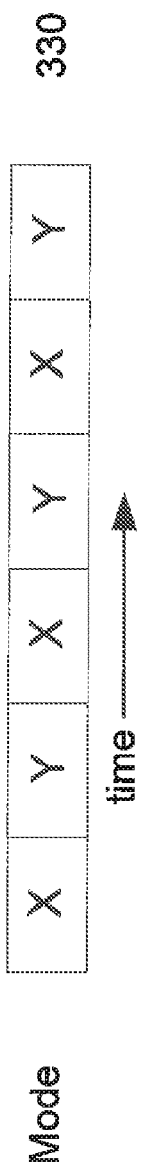

In FIG. 3C, there is a switching 330 between Mode X 310 and Mode Y 320, over time. In the particular example shown in FIG. 3C, the time slots for each of Mode X 310 and Mode Y 320 are equal, and the length of the time slot does not change. This, however, is only one embodiment of switching 330 between Mode X 310 and Mode Y 320. In other embodiments of the switching 330, the time slots for Mode X 310 will be of different duration than the time slots for Mode Y 320. In other embodiments of the switching 330, the modes will not be of fixed time-length, but may rather vary, for example, in accordance with pre-defined PMD time durations which, for example, are stored at both the server-side system 105 and the client-side system 155.

A first embodiment is a method for communicating within a communication system that includes multiple communication channels, a low power mode of operation, and at least one higher-power mode of operation. The system allocates each channel to one of at least two groups, in which group A is channels which do not communicate bits of information in low power mode and which did not communicate bits of information in the previous higher-power mode of operation, and group B is channels which do not communicate bits in low power mode and which did communicate bits of information in the previous higher-power mode. The system does not allocate any power, during low power mode, to the channels in Group A. During low power mode, the system allocates sufficient power to each channel in Group B so that a resulting SNR shall be sufficient for the system to monitor the noise in that channel. In this embodiment, the steps described are implemented in an implementation unit that may be located in either the server-side system 105 or the client-side system 155. If at the server-side 105, then the server-side implementation unit 130 implements the steps. If at the client-side 155, then the client-side implementation unit 190 implements the steps.

A second embodiment is a method for communicating within a communication system that includes multiple communication channels, a low power mode of operation, and at least one higher-power mode of operation. The system allocates each channel to one of at least two groups, in which group A is channels which do not communicate bits of information in low power mode and which did not communicate bits of information in the previous higher-power mode of operation, and group C is channels which communicate bits of information in low power mode. The system does not allocate any power, during low power mode, to the channels in Group A. During low power mode, the system allocates sufficient power to each channel in Group C that a resulting SNR for that channel shall be sufficient for the system to load at least one bit per time slot onto that channel. In this embodiment, the steps described are implemented in an implementation unit that may be located in either the server-side system 105 or the client-side system 155. If at the server-side 105, then the server-side implementation unit 130 implements the steps. If at the client-side 155, then the client-side implementation unit 190 implements the steps.

In an alternative embodiment to the first embodiment described above, the method also includes the system allocating channels to a third group, Group C, which includes channels that communicate bits of information in low power mode. Further, the system also allocates sufficient power to each channel in Group C, during low power mode, so that a resulting SNR shall be sufficient for the system to load at least one bit per time slot onto that channel.

In a possible configuration of the alternative embodiment just described, the channels in Group B are further allocated into subgroups on the basis of a criterion.

In a first possible variation of the configuration just described, the criterion for sub-grouping of the channels in Group B is the duration of time of transmission for each channel.

In a second possible variation of the configuration just described above, the criterion for sub-grouping of channels in group B is random allocation such that no channel in Group B is correlated with any other channel in Group B.

In a third possible variation of the configuration just described above, the criterion for sub-grouping of channels in group B is the kind of noise anticipated for each such channel within Group B.

In a first possible option of the third possible variation just described, the noise anticipated for the channels within Group B is either quickly changing noise or slowly changing noise.

In a first possible format for the first possible option just described, the noise is quickly changing, and the quickly changing noise is selected from the group including ham or other amateur radio operations, police radio operations, and land mobile operations.

In a second possible format for the first possible option just described, the noise is slowly changing noise, and the slowly changing noise is selected from the group including AM radio and FM radio.

In a second possible option of the third possible variation described above, the noise anticipated for each channel within Group B is the level of cross-talk anticipated between two or more channels communicating at substantially the same time, in substantially the same frequency, and, if they are used, with substantially the same codes.

In a possible format of the second possible option just described, the channels are allocated by anticipated level of crosstalk in such a way as to maximize such cross-talk. This is done in order to monitor the possible maximum level of cross-talk between channels.

In a fourth possible variation of the configuration described above, the channels in Group B are repeatedly turned on and off in such a manner that the amount of power-on time is reduced while still maintaining the monitoring of noise within the group B channels.

In a possible option for the fourth possible variation just described, the channels are defined according to one more channels definers.

In a possible format of the possible option just described, the channel definers are selected from the group comprising frequency, time slots, codes, or some combination of the foregoing.

In a fifth possible variation of the configuration described above, the channels in Groups A and B are repeatedly turned on and off in such a manner that the amount of power-on time is reduced while still maintaining the monitoring of noise within the group B channels.

In a possible option for the fifth possible variation just described, the channels are defined according to one more channels definers.

In one possible format for the possible option just described, the channel definers are selected from the group comprising frequency, time slots, codes, or some combination of the foregoing.

Figure 4:
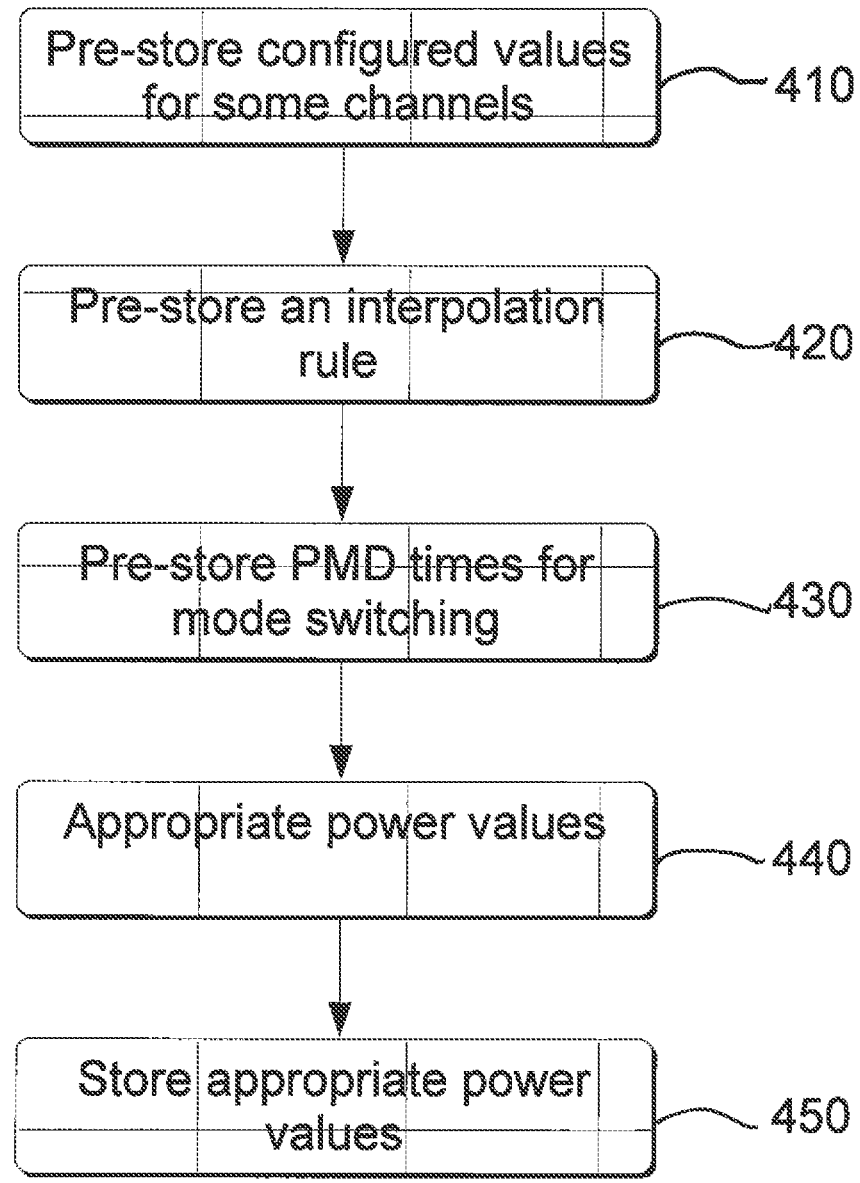
FIG. 4 illustrates one embodiment of a method in a communication system during low-power mode, in which PMD control parameters are stored for later use in a high power mode.

In FIG. 4, there is a communication system that has multiple channels, a low power mode, and a higher-power mode. FIG. 4 illustrates one embodiment of a method for storing, during a low power mode, PMD control parameters to be applied in a higher-power mode. In 410, the system has pre-stored configured values for some of the channels. In 420, the system has pre-stored an interpolation rule for determining approximated power values for channels in the system. In 430, the system has pre-stored PMD times for switching between a low power mode and a higher-power mode. It will be understood that all of this information, being configured values for some of the channels, an interpolation rule, and PMD switching times, will be stored prior to other steps in the method illustrated. In the example illustrated, the order of storing is configured values 410, then interpolation rule 420, then PMD switching times 430, but it is understood that any of these three pieces of information may be stored first, any may be stored second, and any many be stored third, provided that all three are pre-stored prior to additional steps in the method. In 440, the system approximates power values of channels in the system for the next higher-power mode. In 450, the system stores the approximated power values.

In some embodiments, the steps are executed at the server-side system 105, in which storage occurs in the server-side storage unit 135, and approximating values occurs in the server-side calculation unit 140. In such embodiments, upon switch from low power mode to higher-power mode, the server-side receiver 125 will receive transmissions from the client-side transmitter 170, via the communication link 145, and the server-side system 105 will calculate and transmit power adjustments on the basis of the SNR of the signals received.

In some embodiments, the steps are executed at the client-side system 155, in which storage occurs in the server-side storage unit 185, and approximating values occurs in the server-side calculation unit 190. In such embodiments, upon switch from low power mode to higher-power mode, the client-side receiver 175 will receive transmissions from the server-side transmitter 120, via the communication link 145, and the client-side system 155 will calculate and transmit power adjustments on the basis of the SNR of the signals received.

In one embodiment, there is a communication system that includes multiple communication channels, a low power mode of operation, and at least one higher-power mode of operation. The system executes a method for storing, during low power mode, PMD control parameters for a higher-power mode. In particular, the system stores pre-defined configured values for some channels in the systems, a pre-defined interpolation rule approximating power levels of communication channels in the system during a higher-power mode, and pre-defined PMD times for switching from one power mode to another power mode. During a low power mode, the system approximates values at a higher-power mode for channels with stored configured values. The system then stores these approximated values. This embodiment is executed at either the server-side system 105 or the client-side system 155. If at the server-side system 105, then the server-side calculation unit 140 approximates the values, and the server-side storage unit 135 stores the approximated values. If at the client-side system 155, then the server-side calculation unit 190 approximates the values, and the server-side storage unit 185 stores the approximated values.

In a first alternative embodiment of the embodiment just described, the system further uses the approximated values and the interpolation rule to approximate the values of a higher-power mode for the remaining channels.

In a second alternative embodiment of the embodiment just described, the system communicates some of the approximated values from the PMD layer to one or more higher layers in the OSI model. In such a system, the communication to the higher layers occurs in both the server-side system 105 and client-side system 155.

In a third alternative embodiment of the embodiment just described, further after a system switch has begun from low power mode to higher-power mode, a receiver in the system compares service value parameters of signals received to the approximated service value parameters. If the receiver is the server-side receiver 125, then the server-side system 105 also calculates adjusted power levels of channels to optimize service, and modifies the interpolation rule to more accurately reflect the service value parameters of signals received. If the receiver is the client-side receiver 175, then the client-side system 155 also calculates adjusted power levels of channels to optimize service, and modifies the interpolation rule to more accurately reflect the service value parameters of signals received.

In a possible configuration of the first alternative embodiment just described, further after a system switch has begun from low power mode to higher-power mode, a receiver in the system compares service value parameters of signals received to the approximated service value parameters. If the receiver is the server-side receiver 125, then the server-side system 105 also calculates adjusted power levels of channels to optimize service, and modifies the interpolation rule to more accurately reflect the service value parameters of signals received. If the receiver is the client-side receiver 175, then the client-side system 155 also calculates adjusted power levels of channels to optimize service, and modifies the interpolation rule to more accurately reflect the service value parameters of signals received.

In a possible configuration of the second alternative embodiment just described, further after a system switch has begun from low power mode to higher-power mode, a receiver in the system compares service value parameters of signals received to the approximated service value parameters. If the receiver is the server-side receiver 125, then the server-side system 105 also calculates adjusted power levels of channels to optimize service, and modifies the interpolation rule to more accurately reflect the service value parameters of signals received. If the receiver is the client-side receiver 175, then the client-side system 155 also calculates adjusted power levels of channels to optimize service, and modifies the interpolation rule to more accurately reflect the service value parameters of signals received.

Figure 5A:
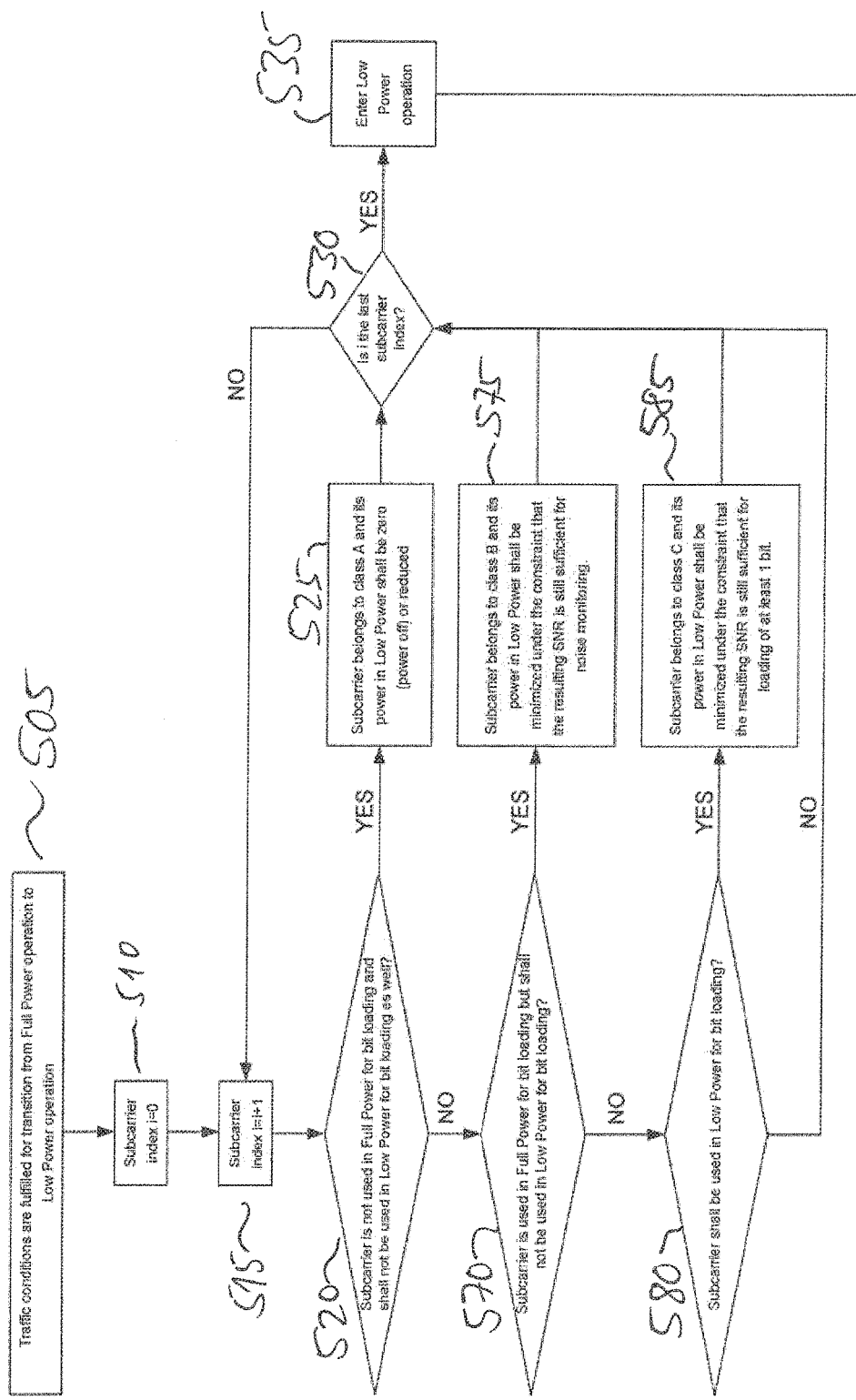
FIGS. 5A and 5B (collectively referred to as FIG. 5) illustrate one embodiment of a flowchart of an exemplary process for switching from a high power operation to a low power operation.
Figure 5B:
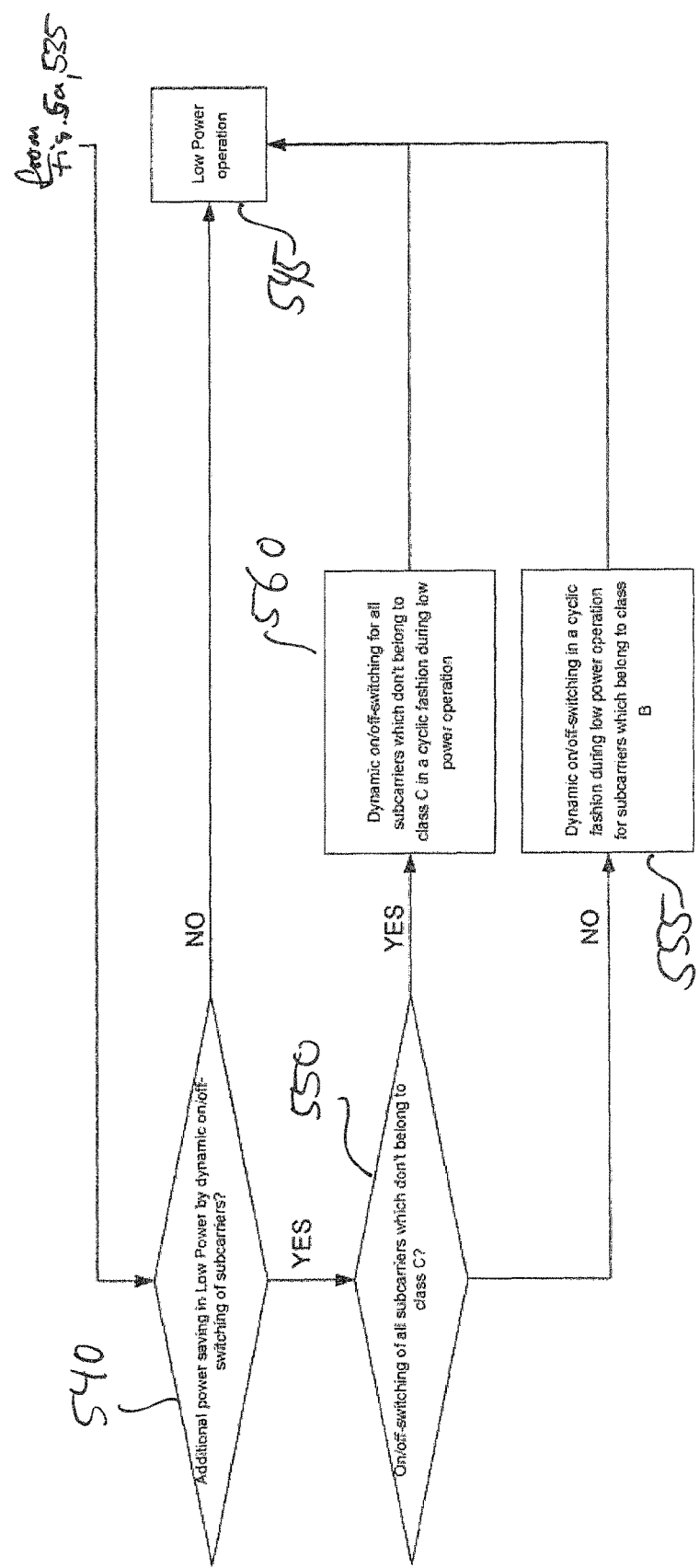

An exemplary embodiment of a method or process for switching from a high power operation to a low power operation is described below with reference to FIG. 5. At 505, the client-side system 155 recognizes that traffic conditions are fulfilled for transition from a high power operation, in particular from a full power operation, to a low power operation. At 510, a subcarrier index variable i is set to zero (i=0). At 515 the subcarrier index variable i is incremented by one (i=i+1). At 520, a check is performed to see, if subcarrier i is not used for bit loading in the high power mode of operation and if subcarrier i shall not be used for bit loading in the low power mode of operation as well. If subcarrier i neither is used for bit loading in the high power mode of operation nor shall be used for bit loading in the low power mode of operation, then, at 525, subcarrier i is determined to belong to and/or assigned to a class A of subcarriers whose power in the low power mode of operation of subcarrier i shall be zero (power off) or at least reduced. Then, at 530, it is checked if i equals the "last"

index, in particular, the largest index used for subcarriers. If so, at 535, the low power mode of operation is to be entered and from 535 the method is continued at 540. Otherwise the method is continued at 515.

If at 520 at least one of the following was found (i) subcarrier i is used in the high power mode of operation for bit loading and (ii) subcarrier i shall be used for bit loading in the low power mode of operation, then, at 570, it is checked if subcarrier i is used for bit loading in the high power mode of operation but shall not be used for bit loading in the low power mode of operation. If so, then, at 575, it is determined that subcarrier i belongs to the class B of subcarriers whose power in the low power mode of operation shall be minimized under the constraint that the resulting signal-to-noise ratio (SNR) is still sufficient for noise monitoring. Then the method is continued at 530 as described above.

If at 570 it was not found that (i) subcarrier i is used for bit loading in the high power mode of operation and (ii) subcarrier i shall not be used for bit loading in the low power mode of operation, then, at 580, it is checked if subcarrier i shall be used for bit loading in the low power mode of operation. If not, the method is continued at 530 as described above. If so, at 585, it is determined that subcarrier belongs to the class C of subcarriers whose power in the low power mode of operation shall be minimized under the constraint that the resulting SNR is still sufficient for loading at least one bit. Then the method is continued at 530 as described above.

At 540, it is checked, if additional power savings should be made in the low power mode of operation by dynamically switching subcarriers on and off. If not, at 545, the low power mode of operation is entered accordingly. If at 540 it was determined that additional power savings should be made in the low power mode of operation by dynamically switching subcarriers on and off, then, at 550, it is checked, if all subcarriers which do not belong to the class C of subcarriers should be switched on and off. If not, at 555, it is determined for subcarriers that belong to class B that these subcarriers should be switched on and off in a cyclic fashion during the lower power mode of operation. Then, at 545, the low power mode of operation is entered. However, if at 550 it was found that all subcarriers which do not belong to the class C of subcarriers should be switched on and off, then at 560, it is determined for all subcarriers that do not belong to class C that these subcarriers should be switched on and off in a cyclic fashion during the lower power mode of operation. Then, at 545, the low power mode of operation is entered.

Figure 6:
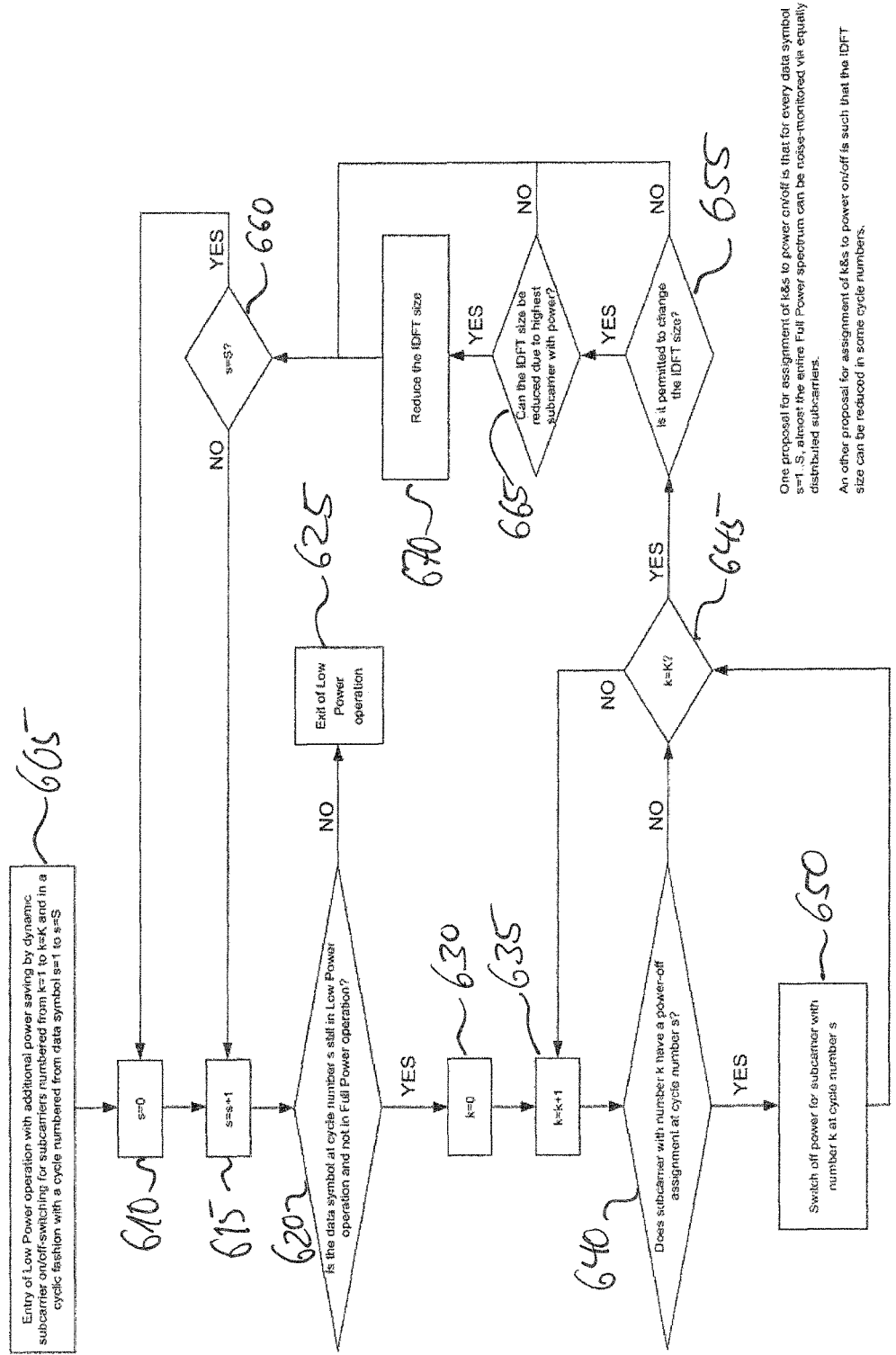
FIG. 6 illustrates one embodiment of a flowchart of an exemplary process for cyclically intermittent signal-to-noise measurement in low power operation.

An exemplary embodiment of a method or process for cyclically intermittent signal-to-noise measurement in low power operation is described below with reference to FIG. 6. At 605, the low power mode of operation is entered wherein the low power mode of operation realizes additional power savings by dynamic subcarrier on/off-switching for subcarriers numbered k=1 to k=K and/or in a cyclic fashion with a cycle numbered from data symbol s=1 to s=S. At 610, a cycle number variable s is set to zero (s=0). At 615 the cycle number variable s is incremented by one (s=s+1). At 620, it is checked if a data symbol at cycle number s is in the low power mode of operation rather than in a high power mode of operation. If not, then at 625 an exit is made from the low power mode of operation. Otherwise, at 630, a subcarrier index variable k is set to zero (k=0). At 635, the subcarrier index variable k is incremented by one (k=k+1). At 640, it is checked if the subcarrier with the index k has a power-off assignment at a cycle with cycle number s (in short: cycle s). If so, at 650, power for subcarrier k is switched of in cycle s and the process moves on to the next process step at 645. Otherwise the process moves directly from the checking at 640 to the next process step at 645. At 645, it is checked if k equals the number K of subcarriers. If not, the process moves on to step 635. Otherwise, at 655, it is checked if it is permitted to change a step size in the inverse Fourier transformation. If not, the process moves on to a step at 660, where it is checked if s equals S. If so the process moves on to 610, otherwise the process moves on to 615. If, at 655, it is determined that it is permitted to change a step size in the inverse Fourier transformation, then, at 665, it is checked if the step size in the inverse Fourier transformation can be reduced. If not, the process moves on to the step at 660. Otherwise, first the step size in the inverse Fourier transformation is reduced, and then the process moves on to the step at 660. The afore-described exemplary embodiment is used in a transmit portion. A corresponding embodiment can be used in a receive portion, wherein, instead of the inverse Fourier transformation, a Fourier transformation is performed.

Figure 7A:
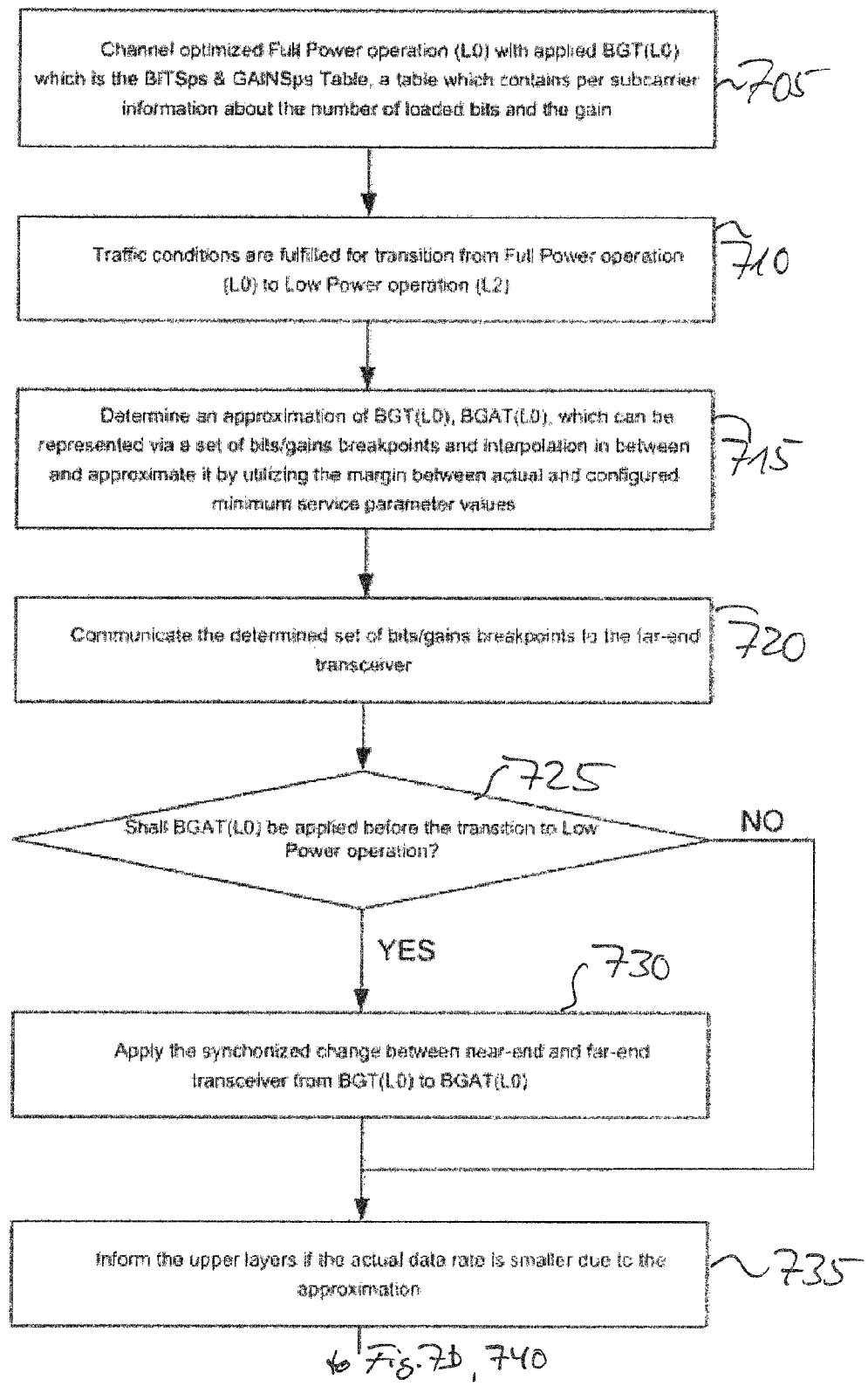
FIGS. 7A and 7B (collectively referred to as FIG. 7) illustrate one embodiment of a flowchart of an exemplary process for subcarrier information handling.
Figure 7B:
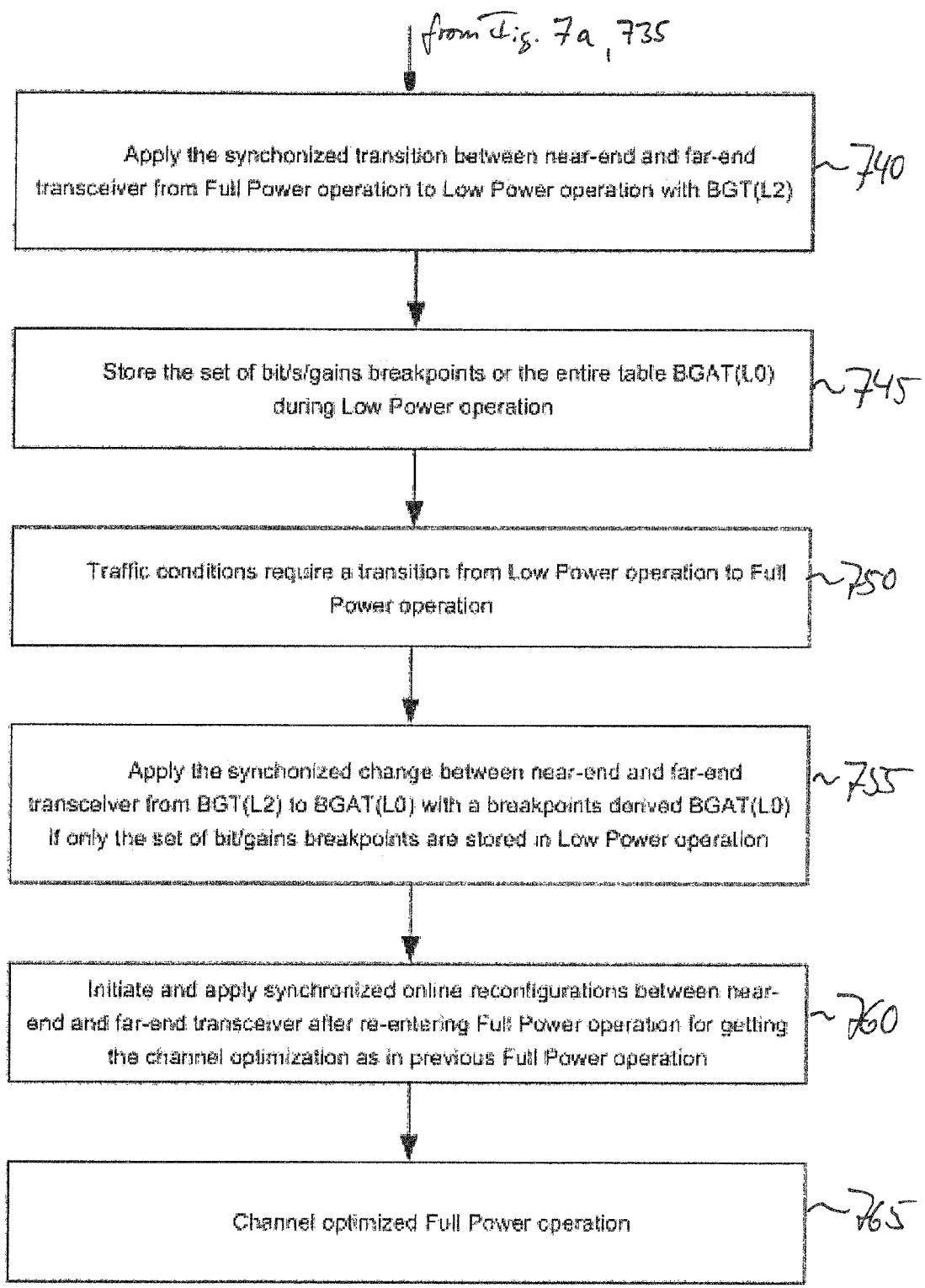

An exemplary embodiment of a method or process for subcarrier information handling is described below with reference to FIGS. 7A and 7B. At 705, a channel operation (L0) is performed with high power. The bit gain table for L0 channel operation (BGT(L0)) is used which contains per subcarrier information about the number of loaded bits and the gain. At 710, traffic conditions are recognized to be fulfilled for transition from the high power mode of operation (L0) to a low power mode of operation (L2). At 715, an approximation BGAT(L0) of values in BGT(L0) is determined. The approximation can be represented via a set of bits/gains breakpoints and interpolation in between. The approximation uses a margin between actual and configured minimum service parameter values. At 720, a set of determined bits/gains breakpoints is communicated to a far-end transceiver. At 725, before the transition to the low power mode of operation, it is checked, if BGAT(L0) shall be applied. If not, at 735, upper layers are informed, if the actual data rate is smaller due to the approximation (or not), otherwise first, at 730, the change is applied in a synchronized fashion between near-end transceiver and far-end transceiver from BGT(L0) and BGAT(L0), before then moving on to the step at 735. Then, at 740, the synchronized transition between near-end transceiver and far-end transceiver from the full power mode of operation to the low power mode of operation is applied with BGT(L2). At 745, the set of bits/gains breakpoints or the entire table BGAT (L0) is stored during the low power mode of operation. At 750, traffic conditions are recognized to require a transition from the low power mode of operation to the high power mode of operation. At 755, if only the set of bits/gains breakpoints are stored during the low power mode of operation, the change from BGT(L2) to BGAT(L0) with breakpoints derived from BGAT(L0) is applied in a fashion synchronized between near-end transceiver and far-end transceiver. At 760, after re-entering the high power mode of operation, for obtaining the channel optimization as in the previous high power mode of operation, synchronized online reconfigurations between near-end transceiver and far-end transceiver are applied. At 765, the channel optimized high power mode of operation is performed.

Figure 8:
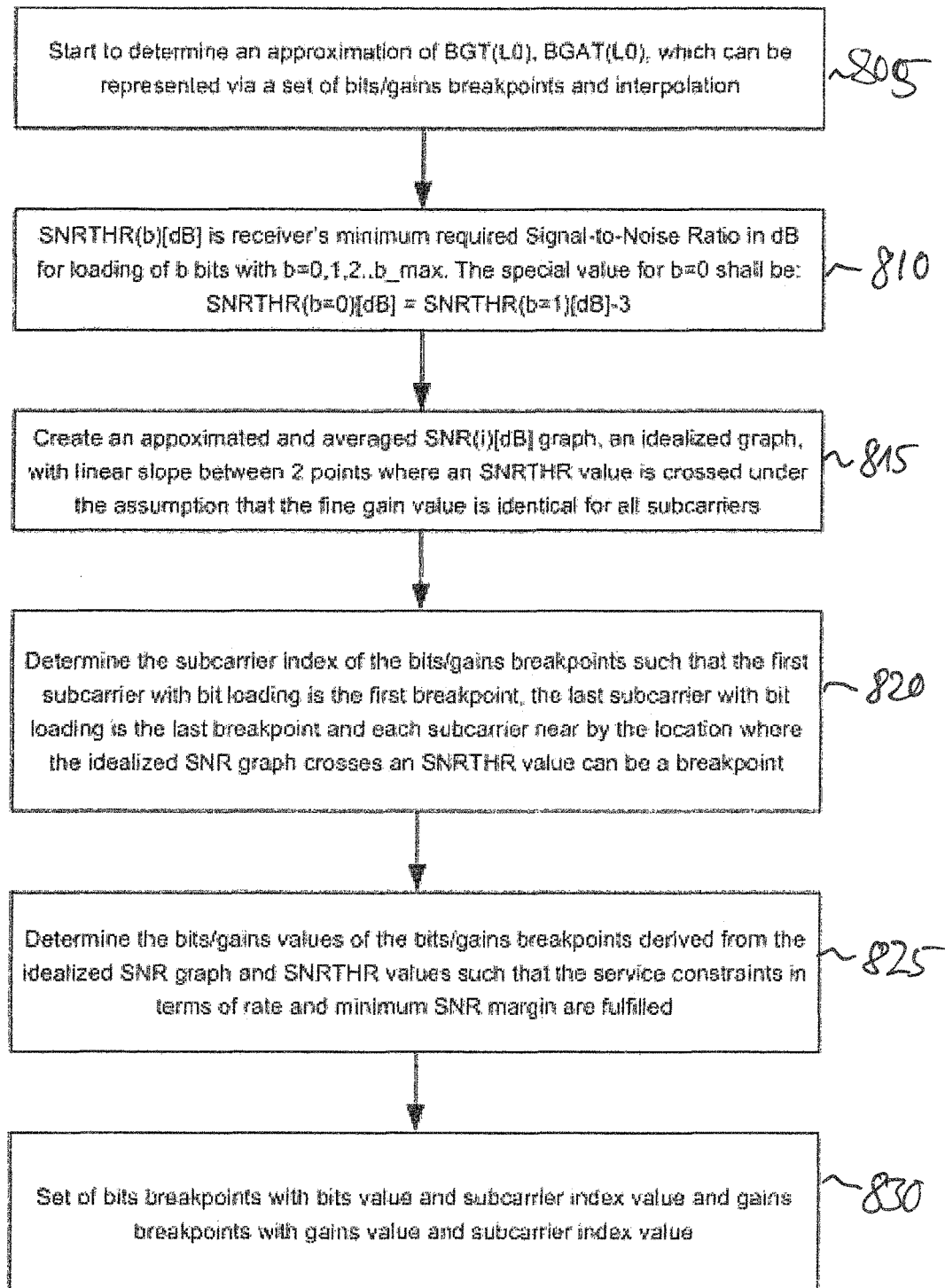
FIG. 8 illustrates one embodiment of a flowchart of an exemplary process for subcarrier information estimation.

An exemplary embodiment of a method or process for subcarrier information estimation is described below with reference to FIG. 8. At 805, an approximation BGAT(L0) of BGT(L0) is started. The approximation BGAT(L0) can be represented via a set of bits/gains breakpoints and interpolation. At 810, a receiver's minimum required signal-to-noise ratio SNRTHR(b) is determined for loading of b bits with b=0, 1, 2 . . . b_max. A special value for b=0 can be SNRTHR(b=0)=SNRTHR(b=1)−3 dB. At 815, an approximated and/or averaged SNR(i) graph is created. Under the assumption that a fine gain value is identical for all subcarriers, an idealized graph with linear slope between two points where an SNRTHR value is crossed can be used. At 820, a subcarrier index of the bits/gains breakpoints can be determined such that the first subcarrier with bit loading is the first breakpoint, the last subcarrier with bit loading is the last breakpoint and each subcarrier near by the location where the idealized SNR graph crosses an SNRTHR value can be a breakpoint. At 825, the bits/gains values of the bits/gains breakpoint derived from the idealized SNR graph and SNRTHR values are determined such that the service constraints in terms of rate and minimum SNR margin are fulfilled. At 830, a set of bits breakpoints with bits value and subcarrier index value and a set of gains breakpoints with gains value and subcarrier index value are provided.

Figure 9:
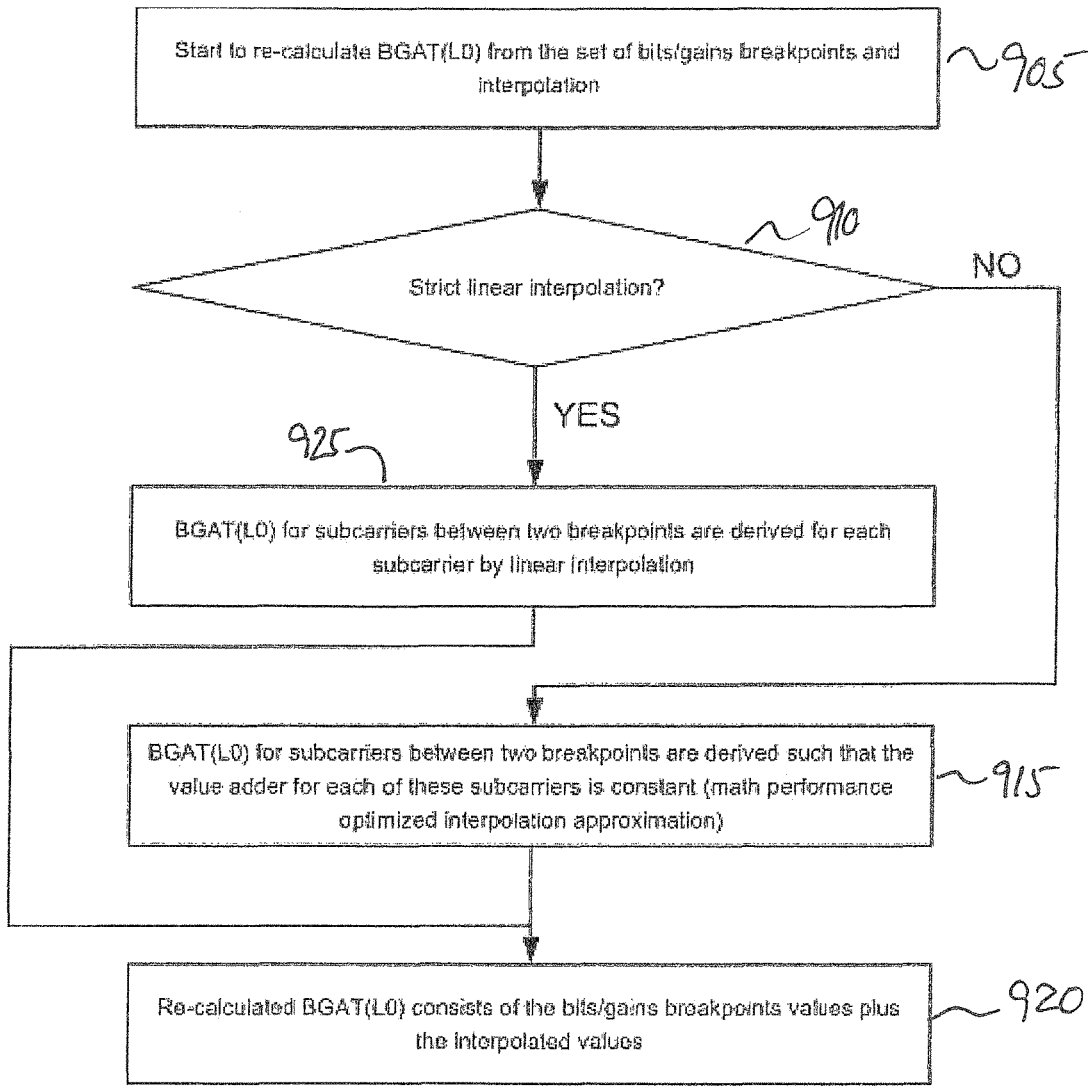
FIG. 9 illustrates one embodiment of a flowchart of an exemplary process used in subcarrier information estimation.

An exemplary embodiment of a process used in subcarrier information estimation is described below with reference to FIG. 9. At 905, a re-calculation of BGAT(L0) is started from the set of bits/gains breakpoints and an interpolation is performed. At 910, it is checked, if the interpolation should be strictly linearly. If so, at 925, BGAT(L0) values for subcarriers between two breakpoints are derived for each subcarrier by linear interpolation. Then, at 920, the re-calculated BGAT(L0) consists of the bits/gains breakpoints values plus the interpolated values. If, at 910, the interpolation is determined not to be strictly linear, then at 915, BGAT(L0) for subcarriers between two breakpoints are derived such that the value adder for each of these subcarriers is constant. In an example, two gains breakpoints are g(l)=[i(l), g(l)] and g(l+1)=[i(l+1), g(l+1)]. A value g_grid defines a smallest gain resolution; in an example, g_grid=1/256 dB. A value g_value_adder=ceil(((g(l+1)−g(l))/(i(l+1)−i(l))/g_grid)*g_grid is used in a loop to calculate a gain value for a respective index i: for i=i(l)+1, i(l+1)−1; g(i)=g(i−1)+g_value_adder; end.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for communicating within a communication system that includes a plurality of communication frequency channels operable to communicate bits of information in a high power mode of operation and operable to in a low power mode of operation, the method comprising for the low power mode of operation:

selectively allocating power to a frequency channel in the plurality of communication frequency channels based on frequency channel use during the high power mode of operation of a respective frequency channel;

and allocating sufficient power to the respective frequency channel not in use to enable measurement of a signal-to-noise ratio in the low power mode of operation, if in the high power mode of operation the respective frequency channel in use communicates bits of information and in the low power mode of operation the respective channel does not communicate bits of information.

2. The method of claim 1, wherein selectively allocating the power comprises, for the respective frequency channel, refraining from allocating any power in the low power mode of operation to the respective frequency channel if in the high power mode of operation the respective frequency channel does not communicate any bits of information.

3. The method of claim 1, wherein the measurement in low power mode of operation is intermittent.

4. The method of claim 3, wherein the measurement is cyclically intermittent.

5. The method of claim 4, wherein at least two respective frequency channels determined to enable intermittent measurement of the signal-to-noise ratio in the low power mode of operation form a group, and wherein power allocated to frequency channels in the group is allocated to one frequency channel in the group at a time.

6. The method of claim 1, wherein measurement of a signal-to-noise ratio comprises performing a Fourier transformation and wherein a number of frequencies used in the Fourier transformation varies with a maximum frequency used for the signal-to-noise ratio measurement in the plurality of communication frequency channels.

7. The method of claim 6, wherein the number of frequencies used in the Fourier transformation varies proportionally to the maximum frequency used for the signal-to-noise ratio measurement in the plurality of communication frequency channels.

8. The method of claim 1, further comprising determining to enable communication of at least one bit of information in the low power mode of operation per predetermined unit of time if in the high power mode of operation the respective frequency channel communicates bits of information.

9. The method of claim 1, wherein the power allocated in the respective frequency channel during the low power mode of operation is commensurate with the determining for the selected frequency channel.

10. The method of claim 1, wherein the high power mode of operation of the respective frequency channel immediately precedes the low power mode of operation of the respective frequency channel.

11. A non-transitory computer readable medium storing software that, when executed on one or more processors in a communication system that includes a plurality of communication frequency channels operable to communicate bits of information in a high power mode of operation and operable to communicate bits of information in a low power mode of operation, causes, one or more operations comprising:

for the low power mode of operation, selectively allocating power to a frequency channel in the plurality of communication frequency channels based on frequency channel use during the high power mode of operation of a respective frequency channel;

and allocating sufficient power to the respective frequency channel not in use to enable measurement of a signal-to-noise ratio in the low power mode of operation, if in the high power mode of operation the respective frequency channel in use communicates bits of information and in the low power mode of operation the respective channel does not communicate bits of information.

12. The non-transitory computer readable medium of claim 11, wherein the power is selectively allocated for the respective frequency channel by refraining from allocating any power to the respective frequency channel in the low power mode of operation if in the high power mode of operation the respective frequency channel does not communicate any bits of information.

13. An apparatus for use in a communications system having a plurality of communication frequency channels operable to communicate bits of information in a high power mode of operation and operable to communicate bits of information in a low power mode of operation, the apparatus comprising:

circuitry configured, for the low power mode of operation, to selectively allocate power to a channel in the plurality of communication frequency channels based on frequency channel use during the high power mode of operation of a respective frequency channel, and selectively allocate the power to the respective frequency channel not in use by allocating sufficient power to the respective frequency channel to enable measurement of a signal-to-noise ratio in the low power mode of operation if in the high power mode of operation the respective frequency channel in use communicates bits of information and in the low power mode the respective frequency channel does not communicate bits of information.

14. The apparatus of claim 13, wherein the circuitry is configured to selectively allocate the power to the respective frequency channel by refraining from allocating any power to the respective frequency channel in the low power mode of operation if in the high power mode of operation the respective frequency channel does not communicate any bits of information.

15. The apparatus of claim 13, wherein the measurement is cyclically intermittent.

16. The apparatus of claim 15, wherein at least two respective frequency channels determined to enable intermittent measurement of the signal-to-noise ratio in the low power mode of operation form a group, the circuitry further being configured to allocate power to frequency channels in the group to one frequency channel in the group at a time.

17. The apparatus of claim 13, wherein the circuitry is further configured to perform, in measurement of a signal-to-noise ratio, a Fourier transformation, wherein a number of frequencies used in the Fourier transformation varies with a maximum frequency used for the signal-to-noise ratio measurement in the plurality of communication frequency channels.

18. The apparatus of claim 17, wherein the number of frequencies used in the Fourier transformation varies proportionally to the maximum frequency used for the signal-to-noise ratio measurement in the plurality of communication frequency channels.

* * * * *